(12) United States Patent
Wetzel

(10) Patent No.: US 6,420,811 B1
(45) Date of Patent: Jul. 16, 2002

(54) ELECTRICAL UNIT

(75) Inventor: Gerhard Wetzel, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/523,953

(22) Filed: Mar. 13, 2000

(30) Foreign Application Priority Data

Mar. 12, 1999 (DE) .......................... 199 10 923

(51) Int. Cl.$^7$ ................................. H02K 7/00
(52) U.S. Cl. ..................... 310/112; 310/91; 310/62; 29/596; 417/360
(58) Field of Search ................. 310/88, 89, 112, 310/91, 62, 63; 29/596; 417/271, 360, 415

(56) References Cited

U.S. PATENT DOCUMENTS

| | | | | |
|---|---|---|---|---|
| 3,448,306 A | * | 6/1969 | Murray | 310/83 |
| 4,628,592 A | * | 12/1986 | Mahon | 29/596 |
| 5,315,194 A | * | 5/1994 | Brusasco et al. | 310/68 R |
| 5,564,909 A | * | 10/1996 | Rischen et al. | 417/273 |
| 5,574,321 A | * | 11/1996 | Baker | 310/67 R |
| 5,620,311 A | * | 4/1997 | Wetzel | 417/415 |
| 5,742,109 A | * | 4/1998 | Volz et al. | 310/89 |
| 5,801,467 A | * | 9/1998 | Volz et al. | 310/89 |
| 5,932,945 A | * | 8/1999 | Volz et al. | 310/89 |
| 6,078,118 A | * | 6/2000 | Reinartz et al. | 310/89 |
| 6,232,687 B1 | * | 5/2001 | Hollenbeck et al. | 310/88 |

FOREIGN PATENT DOCUMENTS

DE  4430909 A1  8/1994
DE  4444644 A1  12/1994

* cited by examiner

*Primary Examiner*—Joseph Waks
(74) *Attorney, Agent, or Firm*—Ronald E. Greigg

(57) ABSTRACT

An electric motor is fastened to a machine, such as a piston pump. For fastening the electric motor to a positioning device, the invention proposes embodying a motor housing with T-shaped fastening elements, whose crossheads are bent into a circle and which engage blind bores in the positioning device and are retained in the blind bores by a calk.

22 Claims, 4 Drawing Sheets

ELECTRICAL UNIT

BACKGROUND OF THE INVENTION

The invention relates to securing an electrical motor to an electrical unit without the use of screws or bolts.

The invention is based on an electrical unit which has an electric motor and a machine that can be driven by it; the electric motor is connected to the machine. The machine can for instance be a piston pump for a slip-controlled vehicle brake system; that is, the electrical unit can be a piston pump assembly of a slip-controlled vehicle brake system. The machine can for instance also be a driven gear. For fastening the electric motor to a machine, it is known to use screws or bolts for fastening the electric motor to the machine. Another fastening possibility is disclosed by German patent disclosure DE 44 44 644 A1. The electric motor there has a cup-shaped housing, whose cylindrical edge protrudes from one face end into a circular groove in a housing of the machine and is secured with a clamping ring inserted into the groove. The clamping ring has a wedge-shaped annular cross section, and it is necessary that the groove in the housing of the machine be made with an outer flank that widens conically toward the bottom of the groove, so that the outer flank of the groove forms an undercut. It is therefore complicated to produce the groove. It is also necessary for the groove to be mounted concentrically to a shaft bearing in the housing of the machine, which because of the tolerance to be adhered to entails considerable effort and expense in production. Another factor of the known electrical unit is that an armature of the electric motor is supported in the housing of the machine, and not in the housing of the electric motor, and thus the function of the electric motor cannot be tested until after the electric motor has been fastened to the machine.

OBJECT AND SUMMARY OF THE INVENTION

In the electrical unit of the invention as defined herinafter the electric motor has one or preferably more fastening elements, which engage an undercut of the machine that can be driven by the electric motor from behind and thus hold the electric motor on the machine. Compared to securing the electric motor to the machine by screws or bolts, the invention has the advantage that the screws as components are dispensed with, and that there is no need to cut threads. The screwing operation is also dispensed with in the assembly of the electrical unit.

Compared to fastening the electric motor by means of a clamping ring in a circular groove, the invention has the advantage of a simpler and more economical connection of the electric motor to the machine. Another advantage is the tolerance of the connection in the radial direction; the undercut on the machine needs to be made with only relatively little precision with respect to positioning of the electric motor on the machine, and mechanical overdetermination of the fastening of the electric motor to the machine is avoided. The fastening element can be integral, for instance with a housing of the electric motor, so that no separate fastening parts are needed.

The subject of the invention is the reversal of the fastening principle, namely that the machine has one fastening element or a plurality of fastening elements that engage the undercut or a plurality of undercuts of the electric motor from behind.

The subject of the invention sets forth advantageous embodiments and further refinements defined hereinafter.

By the disposition of two or more fastening elements uniformly or nonuniformly around the motor shaft, a uniform fastening of electric motor to the machine relative to the motor shaft or an imaginary motor axis can be attained.

If the fastening element is disposed laterally outside a jacket face of the electric motor, then it is accessible for fastening the electric motor.

The electrical unit is intended in particular as a pump assembly having the electric motor and a piston pump that can be driven by the electric motor and a brake system of a vehicle, and it is used in controlling the pressure in wheel brake cylinders. Depending on the type of brake system, the abbreviations ABS (for anti-lock brake system), TCS (traction control system), ESP (electronic stability program) and EHB (electrohydraulic brake system) are used for such brake systems. In the brake system, the pump assembly serves for instance to return brake fluid from a wheel brake cylinder or a plurality of wheel brake cylinders to a master cylinder (ABS) and/or to pump brake fluid out of a supply container into a wheel brake cylinder or a plurality of wheel brake cylinders (TCS or ESP or EHB). The pump assembly is needed for instance in a brake system with wheel slip control (ABS or TCS) and/or a brake system serving as a steering aid (ESP) and/or an electrohydraulic brake system (EHB). With wheel slip control (ABS or TCS), locking of the wheels of the vehicle during a braking event involving strong pressure on the brake pedal (ABS) and/or spinning of the driven wheels of the vehicle in the event of strong pressure on the gas pedal (TCS) can for instance be prevented. In a brake system serving as a steering aid (ESP), a brake pressure is built up in one or more wheel brake cylinders independently of an actuation of the brake pedal or gas pedal, for instance to prevent the vehicle from breaking out of the track desired by the driver. The pump assembly can also be used in an electrohydraulic brake system (EHB), in which the pump assembly pumps the brake fluid into the wheel brake cylinder or wheel brake cylinders if an electric brake pedal sensor detects an actuation of the brake pedal, or in which the pump assembly is used to fill a reservoir of the brake system.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
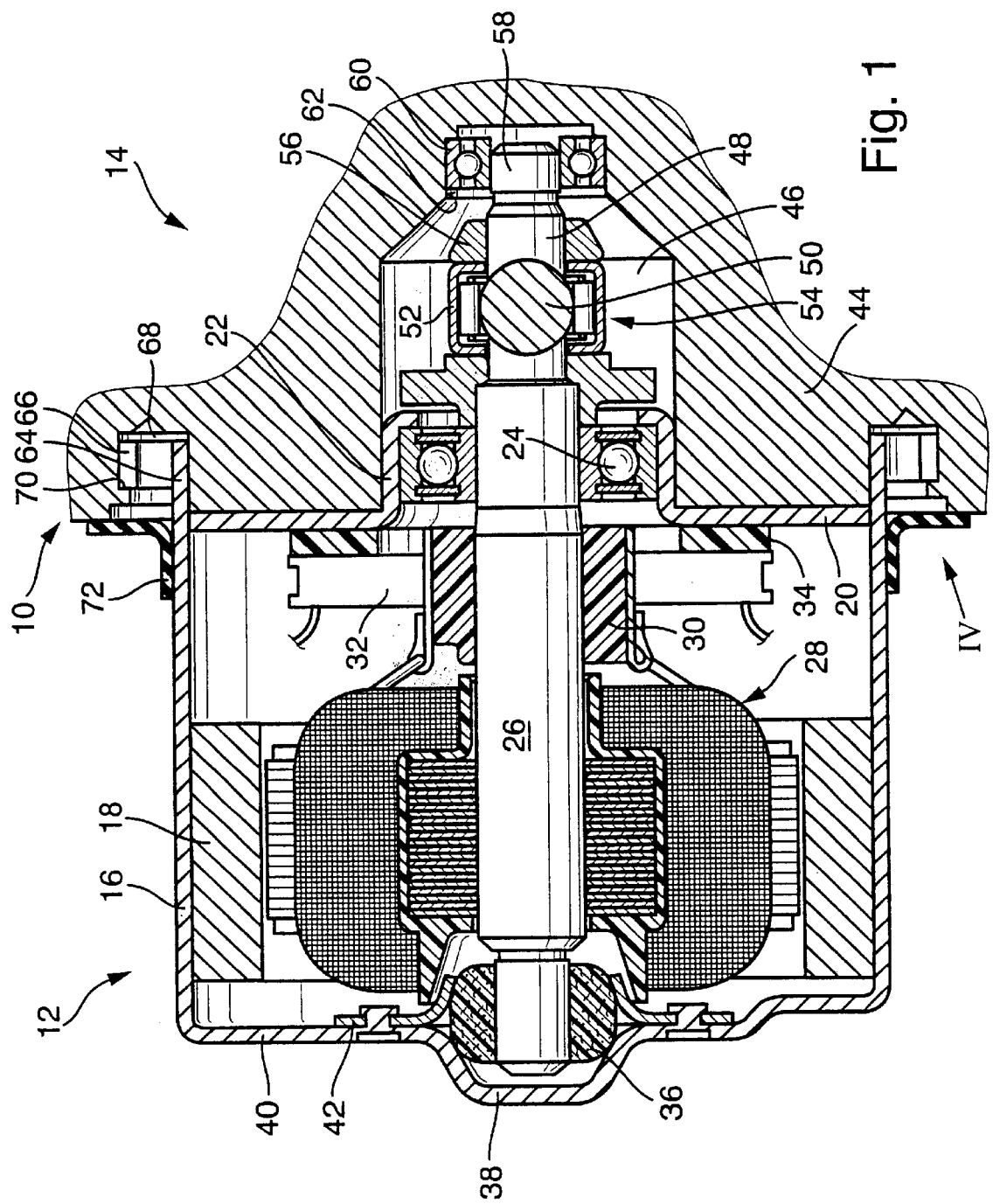
FIG. 1 shows an electrical unit of the invention in axial section.

The electrical unit of the invention, shown in FIG. 1, is a pump assembly 10 with an electric motor 12 which is secured to a piston pump 14. The pump assembly 10 is intended for feeding brake fluid, in a vehicle brake system, not shown, especially one with slip control.

The electric motor 12 has a cylindrical or cup- shaped motor housing 16, which is fastened by its open side to the piston pump 14. Permanent magnets 18 are mounted as a stator on an inside of the motor housing 16.

A motor cap 20 that closes the motor housing 16 is inserted into the open end of the cup-shaped motor housing 16, and in its middle a hollow-cylindrical bearing seat 22 is formed on by reshaping. A ball bearing 24 is press-fitted into the bearing seat 22. The bearing seat 22 protrudes to the outside from the motor cap 20. A motor shaft 26 is rotatably supported in the motor housing 16 by the ball bearing 24.

An armature 28 and a commutator 30 are mounted on the motor shaft 26 in a manner fixed against relative rotation. The commutator 30 cooperates in a manner known per se with carbon brushes that are displaceably received in tubes 32 and are pressed by spring loading against a circumference of the commutator 30. The tubes 32 are secured by plastic brush holders 34 to an inside of the motor cap 20.

On a side remote from the motor cap 20, the motor shaft 26 is rotatably supported by a sintered metal slide bearing 36 in the motor housing 16. The slide bearing 36 is received in a bulge 38 in the middle of a housing bottom 40 that is integral with the motor housing 16 and is retained in the bulge 38 by a resilient securing plate 42, which is riveted to an inside of the housing bottom 40. The pores of the sintered metal slide bearing 36 are filled with a lubricating oil that is resistant to ageing.

The piston pump 14 is accommodated in a hydraulic block which has a positioning device 44, in which in addition to the piston pump 14 other hydraulic components, not shown, such as magnet valves, hydraulic reservoirs and damper chambers are accommodated and hydraulically interconnected. The hydraulic block includes a positioning device 44 for the piston pump 14.

A cylindrical blind bore 46 is made in the pump housing, and this bore is engaged in the manner of a tight fit by the hollow-cylindrical bearing seat 22 of the motor cap 20, and as a result the electric motor 12 is oriented co-axially with the blind bore 46. The bearing seat 22 in the blind bore 46 form a centering device 22, 46 for the electric motor 12 on the hydraulic block.

Inside the blind bore 46, the motor shaft 26 has an eccentric peg 48, which is integral with the motor shaft and is made by metal-cutting machining of the metal shaft 26. Two pistons 50 of the piston pump 14 are disposed radially to the motor shaft 26 and facing one another, in a boxer-type construction. The pistons 50 are axially displaceable in a manner known per se in cylinder bores that are made radially to the blind bore 46 in the positioning device 44; that is, the pistons 50 are guided radially displaceably to the motor shaft 26. The cylinder bores are located in front of and behind the plane of the drawing and are therefore not visible in the drawing. The pistons 50 protrude by their ends into the blind bore 46 of the positioning device 44, where they rest on a bearing ring 52 of a roller bearing 54, which is seating on the eccentric peg 48 for the sake of reducing friction. Driving the eccentric peg 48, which is integral with the motor shaft 26, to rotate, the pistons 50 of the piston pump 14 are driven to execute a reciprocating stroke motion, which in a manner known per se brings about pumping of brake fluid. The roller bearing 54 is secured on the eccentric peg 48 with a securing ring 56 that is seated on the eccentric peg 48. On an end remote from the electric motor 12, the eccentric peg 48 changes over integrally into a bearing journal 58 that is co-axial with the motor shaft 26 and is rotatably supported by a ball bearing 60 in the positioning device 44. The ball bearing 60 is inserted into a countersunk recess 62 on the bottom of the blind bore 46.

Figure 2:
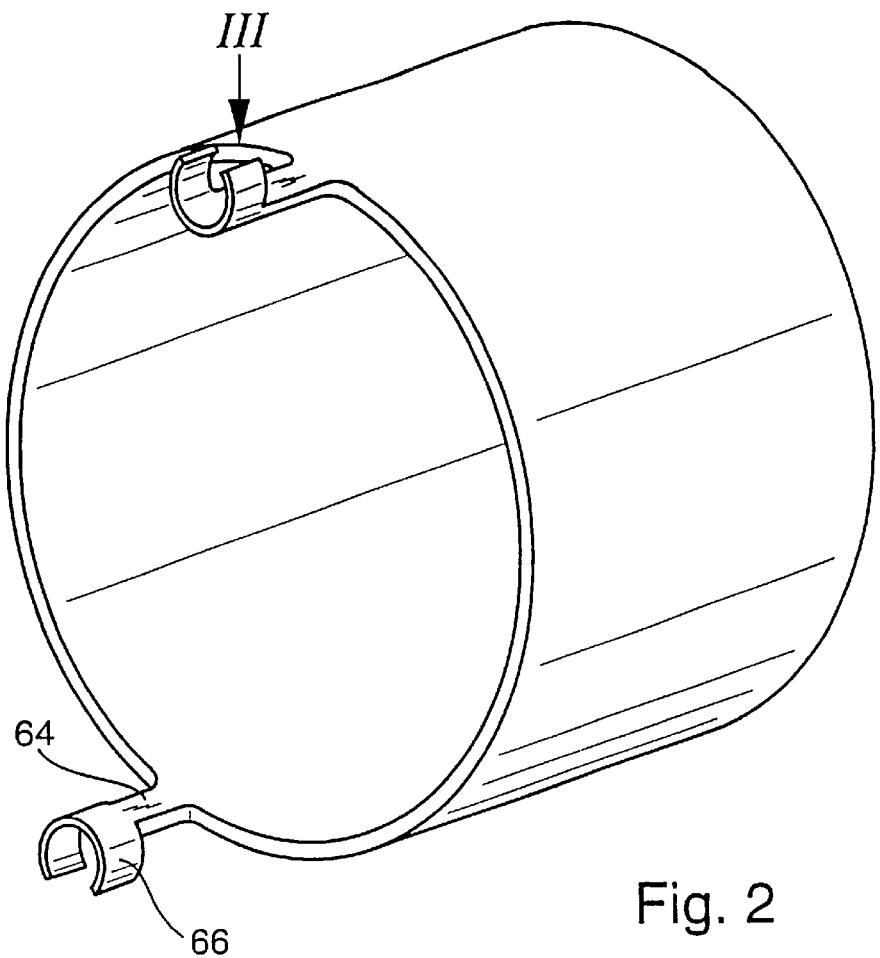
FIG. 2 is a simplified perspective view of a housing of an electric motor of the electrical unit of FIG. 1.
Figure 3:
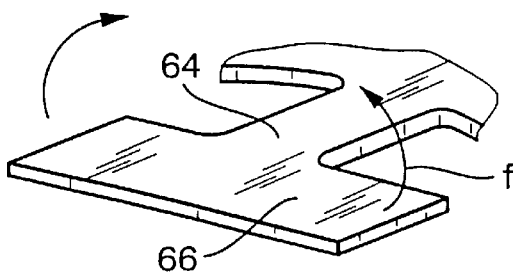
FIG. 3 shows a detail indicated by arrow III in FIG. 2.

For fastening the electric motor 12 to the piston pump 14, the motor housing 16 has two fastening elements 64, which are disposed facing one another on the circumference of the motor housing 16. The shape and disposition of the fastening elements 64 can be seen easily in FIG. 2. The fastening elements 64 can be integral with the cup-shaped motor housing 16, or with the housing of the piston pump 14; the fastening elements 64 protrude axially parallel from a free edge of one of the housings. The fastening elements 64 initially have the T-shape shown in FIG. 3; a crosshead 66 is bent in the direction of the arrows f in FIG. 3 into a circular form, as can be seen in FIG. 2. The crosshead 66 is bent outward; it is located outside an imaginary jacket face of the motor housing 16. The invention is not limited to the T-shape of the fastening elements 64 shown; an L-shape or other shape can also be considered as long as it allows engagement of an undercut of the piston pump 14 from behind. The fastening elements 64 form fastening anchors.

Two cylindrical blind bores 68 are made in the positioning device 44, and the positioning device is part of the housing opposite to the housing on which the fastening elements are mounted; their diameter is equivalent to a diameter of the circular crosshead 66 of the fastening elements 64. The blind bores 68 have a depth greater than the length of the fastening elements 64, so that the fastening elements 64 do not rest on the bottom of the blind bores 68. For fastening, the electric motor 12 is placed against the positioning device 14, so that the bearing seat 22 of the electric motor 12 engages the blind bore 46 in the manner of a tight fit, thereby co-axially positioning the electric motor 12 relative to the blind bore 46. As the electric motor 12 is placed against the positioning device 44, the fastening elements 64 enter the blind bores 68. By means of a calk 70 of the positioning device 44 on an open end of the blind bores 68, the electric motor 12 is fastened to the positioning device 44. The calk 70 forms an undercut of the positioning device 44, which is engaged from behind by the crossheads 66 of the fastening elements 64. Since the blind bores 68 are deeper than the length of the fastening elements 64 engaging them, the fastening elements 64 do not rest with their crossheads 66 on the bottom of the blind bores 68; the electric motor 12 is fastened to the positioning device 44 with initial stress by the calks 70. Since the blind bores 68 are located outside the motor housing 16, they are accessible so that the calks 70 can be made.

On the free edge of the motor housing 16, contacting the positioning device 44, a seal 72 of L-shaped cross section is mounted; it covers the blind bores 68 and seals off the electric motor 12 at the positioning device 44 and prevents water from penetrating between the electric motor 12 and piston pump 14.

Figure 4:
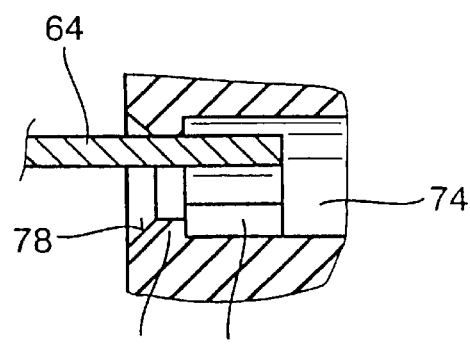
FIG. 4 shows a detail of a modified embodiment.

FIG. 4 shows an alternative option for securing the fastening elements 64 to the positioning device 44. The fastening elements 64 with their crossheads 66 are embodied identically to the version shown in FIGS. 1 through 3. A cylindrical hole 74 is made in the positioning device 44 and is engaged by the fastening elements 64. In the region of its opening, the hole 74 has an inward-protruding annular shoulder 76, which forms an undercut that is engaged from behind by the crosshead 66 of the fastening element 64. A chamfer 78 effects an elastic compression of the crosshead 66 upon introduction of the fastening element 64 into the hole 74. Once the crosshead 66 has overcome the annular shoulder 76, the crosshead 66 rebounds elastically to its original diameter and as a result engages the annular shoulder 76 from behind. In this version of the invention, the fastening of the electric motor 12 to the piston pump 14 is accomplished by simply pressing the electric motor 12 against the piston pump 14; the engagement of the annular shoulder 76 in the hole 74 from behind by the crossheads 66 takes place automatically by elastic rebounding of the circular crossheads 66, without requiring any calking or the like. This version of the invention can be considered particularly whenever the hole 74 is accessible from a side remote from the electric motor 12, so that the annular shoulder 76 that forms the undercut can be produced without problems. The version of the invention shown in FIG. 4 is also possible whenever the positioning device 44 is thin-walled in the region of the fastening elements 64.

Figure 5:
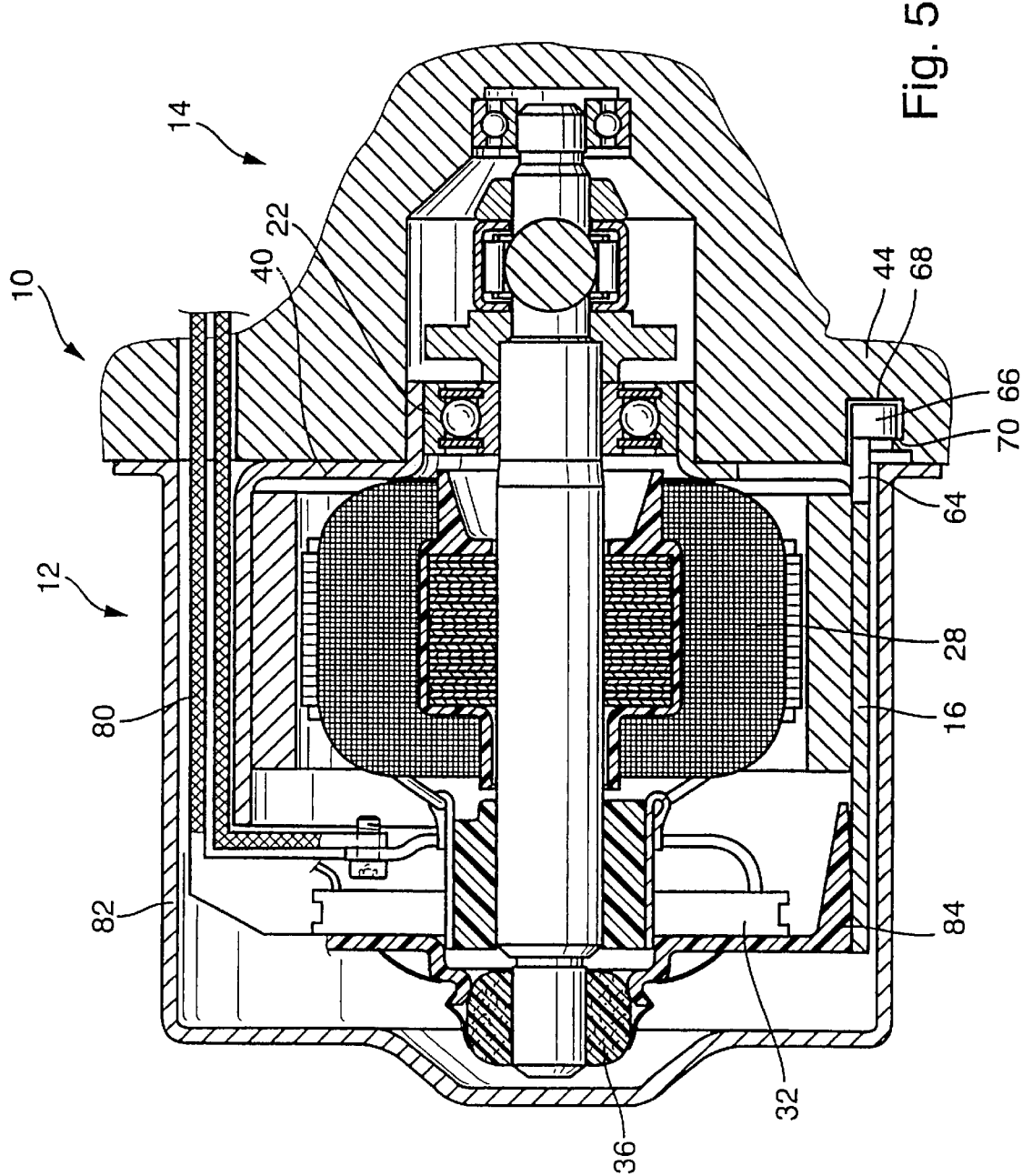
FIG. 5 shows a second exemplary embodiment of an electrical unit according to the invention.
Figure 6:
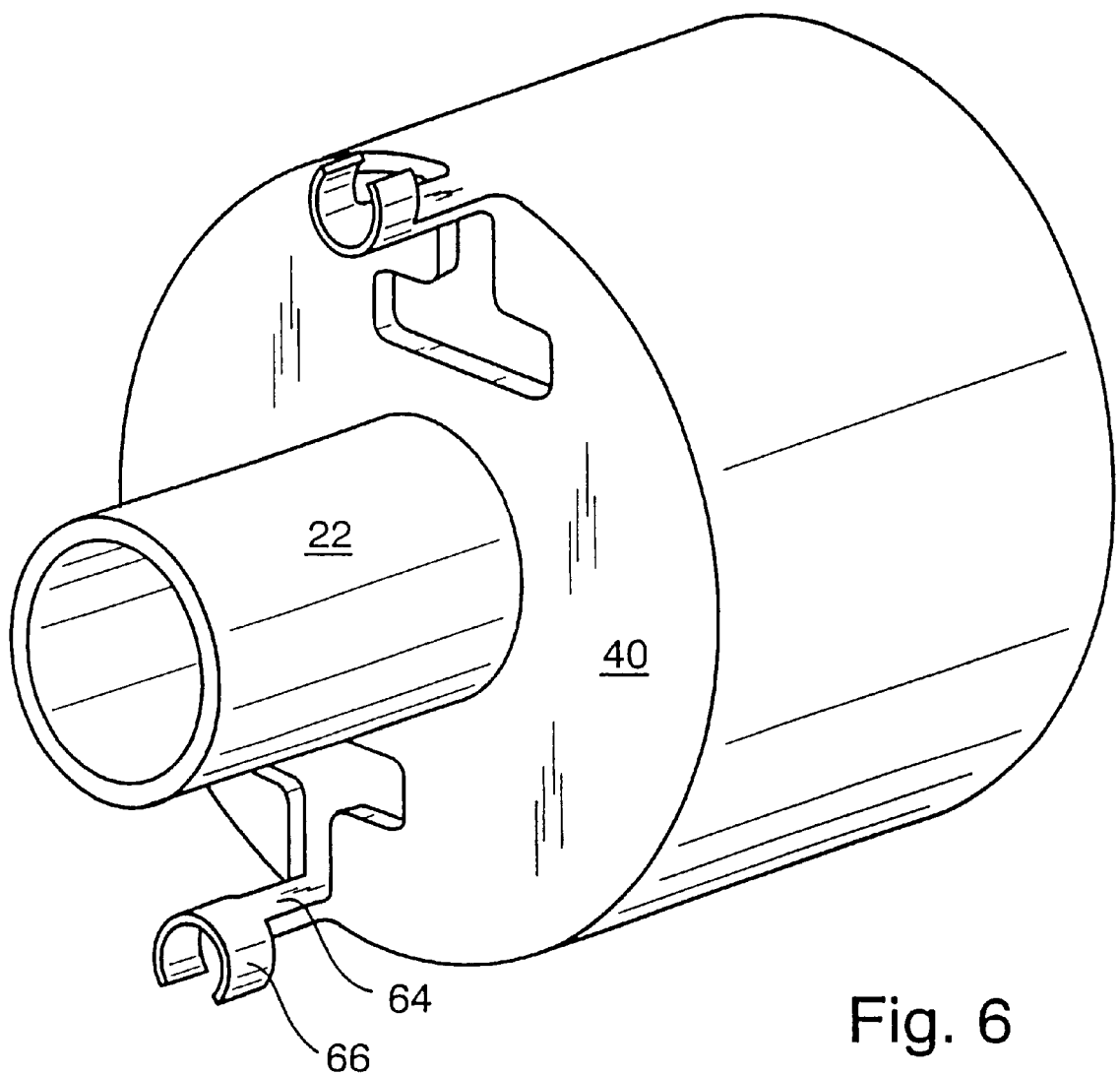
FIG. 6 is a simplified perspective view of one of the housings of the electrical unit of FIG. 5.

A second exemplary embodiment of an electrical unit 10 of the invention is shown in FIG. 5. For FIGS. 5 and 6, the same reference numerals will be used below as in FIGS. 1 through 3 for identical components. The motor housing 16 of the exemplary embodiment shown in FIGS. 5 and 6 is again cup-shaped, but the closed side of the motor housing 16 faces toward the piston pump 14; the motor housing 16 rests with its housing bottom 40 on the positioning device 44. The bearing seat 22 is formed onto the housing bottom 40. The T-shaped fastening elements 64 are stamped out in the housing bottom 40 and bent to protrude axially parallel from the motor housing 16. The fastening of the electric motor 12 to the piston pump 14 is done, as described for FIGS. 1 through 3, with the fastening elements 64 that engage the blind bores 68 in the positioning device 44, with their circular crossheads 66 engaging a calk 70 in the blind bores 68 from behind. To prevent repetition, reference is made to this extent to the above description of FIGS. 1 through 3.

The commutator 30 of the electric motor 12 and the carbon brushes resting resiliently in the tubes 32 are disposed on a side of the armature 28 remote from the piston pump 14; that is, the carbon brushes are located on the open side of the motor housing 16 and are therefore readily accessible. The tubes 32 of the carbon brushes are secured to a plastic brush holder plate 84 in the form of a circular disk, which is inserted into the open side of the motor housing 16. Since the carbon brushes are located on the open side of the motor housing 16, they are also readily accessible as soon as the electric motor 12 has been fastened to the piston pump 14, so that electrical contacting of the electric motor 12 is easily possible retroactively as well. Electrical terminals of the electric motor 12 are guided in the form of insulated conductor strips 80 along an outside of the motor housing 16 and carried into the positioning device 44, where they are provided with electrical contact by means of a mounted electronic control unit, not shown in the drawing.

The sintered metal slide bearing 36 is secured to the brush holder plate 84. The electric motor 12 is covered with a cup-shaped motor cover 82, which is placed with its open side on the positioning device 44. For waterproof mounting, the motor cover 82 can be glued by its free edge to the positioning device 44, thus encapsulating the electric motor 12 along with its electrical terminals (conductor strips 80).

Both exemplary embodiments of the invention shown and described here have the advantage that the electric motor 12 is capable of operation before being fastened to the piston pump 14, so that its function can be tested independently of and prior to its being fastened to the piston pump 14.

The foregoing relates to a preferred exemplary embodiments of the invention, it being understood that other variants and embodiments thereof are possible within the spirit and scope of the invention, the latter being defined by the appended claims.

I claim:

1. An electrical unit having an electric motor and a machine that can be driven by the electric motor, the electric motor and machine being connected to one another, the electric motor (12) has a fastening element (64), which engages an undercut (70; 76) of the machine (14) from behind, wherein after the electric motor is positioned against the machine (14), the undercut (70) is formed by a calking, so that the undercut (70) thus exerts an initial tension on the fastening element (64).

2. The electrical unit according to claim 1, characterized in that the electrical unit (10) has a plurality of said fastening elements (64), which are disposed around a motor shaft (26).

3. The electrical unit according to claim 1, in which the electrical unit (10) has a positioning device (22, 46), which positions the electric motor (12) on the machine (14).

4. The electrical unit according to claim 1, in which the fastening element (64) is embodied as L- or T-shaped.

5. The electrical unit according to claim 4, in which a crosshead (66) of the L- or T-shaped fastening element (64) is circular.

6. The electrical unit according to claim 1, in which the fastening element (64) is disposed outside a jacket face of the electric motor (12).

7. The electrical unit according to claim 1, in which the undercut is formed by a calk (70).

8. The electrical unit according to claim 1, in which the undercut (70; 76) exerts an initial stress on the fastening element (64).

9. The electrical unit according to claim 1, in which the electrical unit (10) has a seal (72), which seals between the electric motor (12) and the machine (14).

10. The electrical unit according to claim 1, in which the electric motor (24) has a cylindrical motor housing (16), from which the fastening element (64) protrudes in a direction of the machine (14).

11. The electrical unit according to claim 1, in which the machine (14) has a piston pump, which is driven by the electric motor (12).

12. An electrical unit having an electric motor and a machine that can be driven by the electric motor, the electric motor and machine being connected to one another, the machine (14) has a fastening element, which engages an undercut of the electric motor (12) from behind, wherein after the electric motor is positioned against the machine (14), the undercut (70) is formed by a calking, so that the undercut (70) thus exerts an initial tension on the fastening element (64).

13. The electrical unit according to claim 12, characterized in that the electrical unit (10) has a plurality of said fastening elements (64), which are disposed around a motor shaft (26).

14. The electrical unit according to claim 12, in which the electrical unit (10) has a positioning device (22, 46), which positions the electric motor (12) on the machine (14).

15. The electrical unit according to claim 12, in which the fastening element (64) is embodied as L- or T-shaped.

16. The electrical unit according to claim 15, in which a crosshead (66) of the L- or T-shaped fastening element (64) is circular.

17. The electrical unit according to claim 12, in which the fastening element (64) is disposed outside a jacket face of the electric motor (12).

18. The electrical unit according to claim 12, in which the undercut is formed by a calk (70).

19. The electrical unit according to claim 12, in which the undercut (70; 76) exerts an initial stress on the fastening element (64).

20. The electrical unit according to claim 12, in which the electrical unit (10) has a seal (72), which seals between the electric motor (12) and the machine (14).

21. The electrical unit according to claim 12, in which the machine (14) has a piston pump, which is driven by the electric motor (12).

22. An electrical unit having an electric motor and a machine that can be driven by the electric motor, the electric motor and machine being connected to one another, one of the electric motor (12) and the machine (14) having one or more fastening elements (64), and the other having one or more undercuts (70, 76), wherein the fastening elements (64) engage the undercuts (70; 76) from behind, and wherein, after the electric motor is positioned against the machine (14), the undercuts (70) are formed by calking, so that the undercuts (70), as they are formed, thus exert an initial tension on the fastening elements (64) to hold the electric motor (12) and the machine (14) tightly together.

\* \* \* \* \*